(12) United States Patent
Ashmore

(10) Patent No.: US 7,493,441 B2
(45) Date of Patent: Feb. 17, 2009

(54) MASS STORAGE CONTROLLER WITH APPARATUS AND METHOD FOR EXTENDING BATTERY BACKUP TIME BY SELECTIVELY PROVIDING BATTERY POWER TO VOLATILE MEMORY BANKS NOT STORING CRITICAL DATA

(75) Inventor: Paul Andrew Ashmore, Longmont, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 342 days.

(21) Appl. No.: 11/079,981

(22) Filed: Mar. 15, 2005

(65) Prior Publication Data

US 2006/0212651 A1  Sep. 21, 2006

(51) Int. Cl.
G06F 12/06 (2006.01)
(52) U.S. Cl. ............................ 711/5; 711/113; 711/114; 365/229
(58) Field of Classification Search .................. None
See application file for complete search history.

(56) References Cited

U.S. PATENT DOCUMENTS

| | | | | |
|---|---|---|---|---|
| 5,325,509 A | * | 6/1994 | Lautzenheiser | 711/137 |
| 5,404,543 A | * | 4/1995 | Faucher et al. | 713/323 |
| 5,608,720 A | * | 3/1997 | Biegel et al. | 370/249 |
| 5,774,643 A | * | 6/1998 | Lubbers et al. | 714/20 |
| 5,886,561 A | * | 3/1999 | Eitan et al. | 327/408 |
| 5,905,994 A | * | 5/1999 | Hori et al. | 711/113 |
| 6,243,315 B1 | | 6/2001 | Goodman | |
| 6,731,563 B1 | | 5/2004 | Yokoyama et al. | |
| 6,760,806 B2 | | 7/2004 | Jeon | |
| 6,795,362 B2 | | 9/2004 | Nakai et al. | |
| 6,847,559 B2 | | 1/2005 | Oh et al. | |
| 7,003,534 B2 | * | 2/2006 | Peng | 707/203 |

FOREIGN PATENT DOCUMENTS

WO  WO2004066050  *  8/2004

OTHER PUBLICATIONS

Griffith et al. A 2K Byte Fully-Associative Cache Memory With On-Chip Dram Control. Custom Integrate Circuits Conference, 1989., Proceedings of the IEEE 1989 [online], May 15-18, 1989 [retieved on Apr. 5, 2007]. Retrieved from the Internet <URL: http://ieeexplore.ieee.org/iel2/803/2057/00056727.pdf?arnumber=56727>.*

* cited by examiner

Primary Examiner—Reginald G Bragdon
Assistant Examiner—Larry T Mackall
(74) Attorney, Agent, or Firm—E. Alan Davis

(57) ABSTRACT

A battery-backed write-caching mass storage controller is disclosed. The controller includes a plurality of volatile memory banks for caching write data prior to being written to disk drives. Critical data is stored into a first subset of the memory banks, leaving a second subset of memory banks storing only non-critical data. Critical data is data that must be retained during a main power loss to avoid loss of write-cached user data. Critical data includes the write-cached user data itself, as well as metadata describing the write-cached user data. When the controller detects a loss of main power, the controller causes the critical memory banks to receive battery power, but disables battery power to the non-critical memory banks in order to extend the length of time the critical memory banks can continue to receive battery power to reduce the likelihood of user data loss.

43 Claims, 2 Drawing Sheets

MASS STORAGE CONTROLLER WITH APPARATUS AND METHOD FOR EXTENDING BATTERY BACKUP TIME BY SELECTIVELY PROVIDING BATTERY POWER TO VOLATILE MEMORY BANKS NOT STORING CRITICAL DATA

FIELD OF THE INVENTION

The present invention relates in general to the field of mass storage controllers, and particularly to write-caching controllers that use a battery to avoid loss of write-cached user data.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

An important characteristic of RAID controllers, particularly in certain applications such as transaction processing or real-time data capture of large data streams, is to provide fast write performance. In particular, the overall performance of the computer system may be greatly improved if the write latency of the RAID controller is relatively small. The write latency is the time the RAID controller takes to complete a write request from the computer system.

Many RAID controllers include a relatively large cache memory for caching user data from the disk drives. Caching the data enables the RAID controller to quickly return data to the computer system if the requested data is in the cache memory since the RAID controller does not have to perform the lengthy operation of reading the data from the disk drives. The cache memory may also be employed to reduce write request latency by enabling what is commonly referred to as posted-write or write-caching operations. In a write-cache or posted-write operation, the RAID controller reads the user data specified by the computer system from the computer system into the RAID controller's cache memory and then immediately notifies the computer system that the write request is complete, even though the RAID controller has not yet written the user data to the disk drives. Posted-writes are particularly useful in RAID controllers, since in some redundant RAID levels a read-modify-write operation to the disk drives must be performed in order to accomplish the system write request. That is, not only must the specified user data be written to the disk drives, but some of the disk drives may also have to be read before the user data and redundant data can be written to the disks, which may make the write latency of a RAID controller even longer than a non-RAID controller.

However, posted-write operations make the system vulnerable to data loss in the event of a power failure. This is because the cache memory is a volatile memory that loses the user data when power is lost and the data has not yet been written to the disk drives.

To solve this problem, some RAID controllers include a battery to continue to provide power to the cache memory in the event of a loss of main power. Typically, the system automatically notifies a system administrator who attempts to restore power to the system. Although the battery greatly reduces the likelihood that user data will be lost, because the charge on the battery is finite, the possibility still exists that the battery power will run out before main power can be restored, in which case the user data will be lost. Thus, it is crucial to consume as little battery power as possible during the main power outage to increase the likelihood that the battery will not run out before main power is restored. Therefore what is needed is an apparatus and method for reducing the battery consumption during the main power outage.

BRIEF SUMMARY OF INVENTION

The present invention provides a write-caching mass storage controller that segregates and stores critical data (write-cached data and metadata describing the write-cached data) into one subset of volatile memory banks leaving another subset of volatile memory banks storing only non-critical data. In response to a loss of main power, the controller only provides battery power to the critical memory banks, but not to the non-critical memory banks, in order to reduce the amount of battery power consumed during the main power outage, thereby extending the time the critical memory banks can store the critical data to reduce the likelihood of user data loss.

In one aspect, the present invention provides a write-caching mass storage controller. The controller includes a plurality of volatile memory banks, each having separate power inputs. The controller also includes a battery, coupled to provide power to the plurality of volatile memory banks via the separate power inputs, during a main power loss. The controller also includes a processor, coupled to the plurality of volatile memory banks, which controls storage of critical data to a first subset of the plurality of volatile memory banks and refrains from controlling storage of the critical data to a second subset of the plurality of volatile memory banks. The first and second subsets of virtual memory banks are mutually exclusive. The critical data comprises data which must be retained during the main power loss to avoid loss of write-cached user data. The controller also includes control logic, coupled to receive information from the processor indicating the first and second subsets of the plurality of volatile memory banks. The control logic detects the loss of main power and in response disables the second subset of the plurality of volatile memory banks from receiving power from the battery.

In another aspect, the present invention provides a method for reducing battery power consumption during a main power loss to reduce the likelihood of loss of user write-cached data in a write-caching mass storage controller. The method includes storing information indicating first and second subsets of a plurality of volatile memory banks of the controller. Each of the first and second subsets are configured to separately receive power from the battery. The first and second subset are mutually exclusive. The method also includes storing critical data to the first subset of the plurality of volatile memory banks in exclusion of the second subset of the plurality of volatile memory banks, after storing the information. The critical data comprises data which must be retained during the main power loss to avoid loss of write-cached user data. The method also includes detecting the main power loss, after storing the critical data. The method also includes disabling the second subset of the plurality of volatile memory banks from receiving power from the battery in response to detecting the loss of main power.

In another aspect, the present invention provides a write-caching mass storage controller. The controller includes a plurality of volatile memory banks, each having separate power inputs. The controller also includes a battery, coupled to provide power to the plurality of volatile memory banks via the separate power inputs, during a main power loss. The controller also includes a processor, coupled to the plurality of volatile memory banks, which controls storage of critical data to a first subset of the plurality of volatile memory banks and refrains from controlling storage of the critical data to a second subset of the plurality of volatile memory banks. The first and second subsets of volatile memory banks are mutually exclusive. The critical data comprises data which must be retained during the main power loss to avoid loss of write-cached user data. The control logic detects the loss of main power and responsively disables the second subset of the plurality of volatile memory banks from receiving power from the battery.

DETAILED DESCRIPTION

Figure 1:
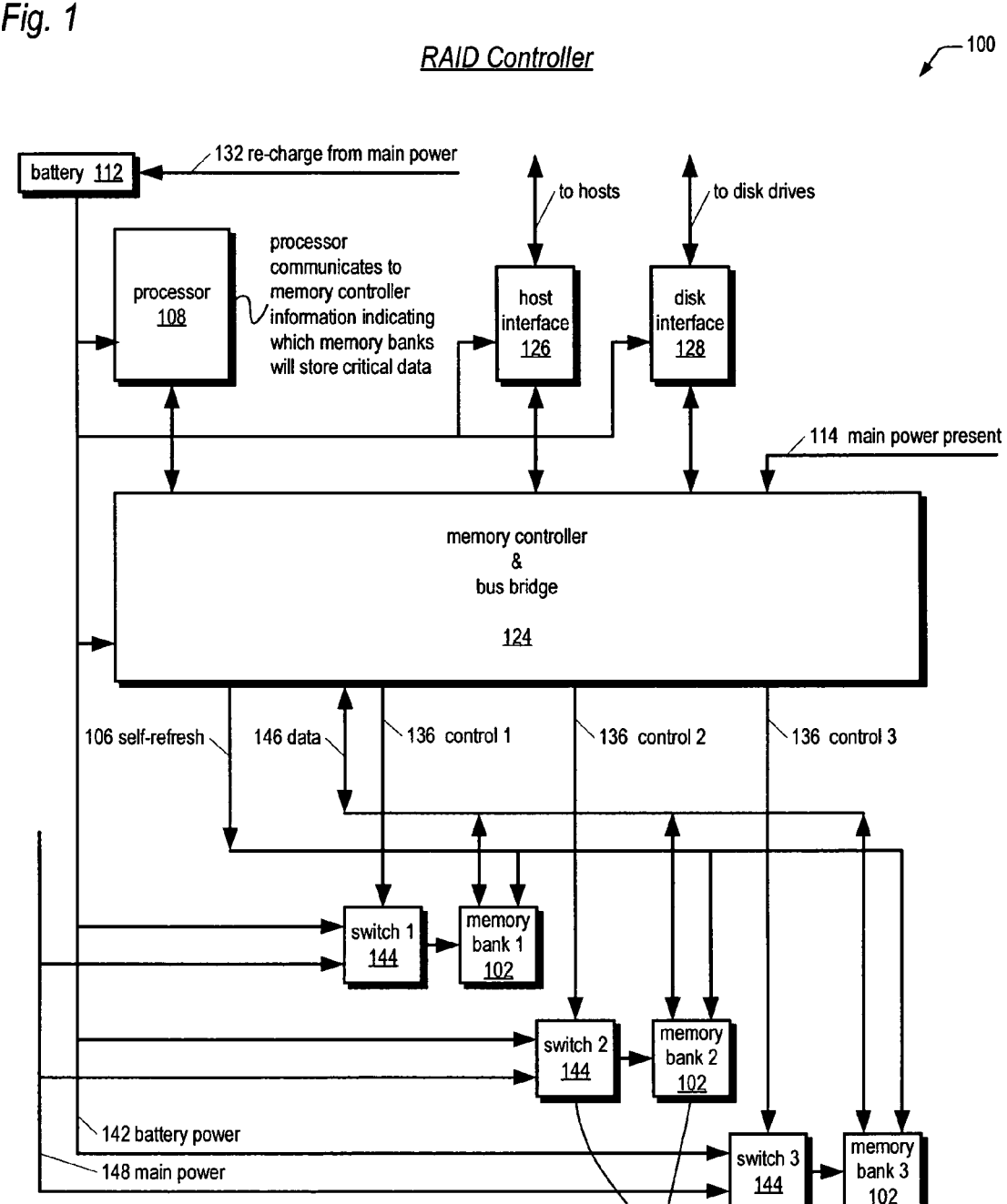
FIG. 1 is a block diagram illustrating a write-caching mass storage controller according to the present invention.

Referring now to FIG. 1, a block diagram illustrating a write-caching mass storage controller 100, such as a write-caching RAID controller, according to the present invention is shown. In one embodiment, the controller 100 may be one of a pair of active-active redundant fault-tolerant RAID controllers for providing high data availability. Advantageously, the controller 100 powers down volatile memory banks that are not storing critical data in response to a loss of main power in order to extend the time that the battery can supply power to the volatile memory banks storing critical data to avoid loss of user data, as described herein.

As used herein, the term critical data is intended to denote data which must be retained by the controller 100 during a loss of main power to avoid loss of write-cached user data. The critical data may include, but is not limited to, the write-cached data itself, metadata, and log data. Metadata is data that describes the write-cached data, such as: the location of the write-cached user data in volatile memory banks of the controller 100; disk drive unit numbers and the location on disk drives to which the write-cached user data is to be written by the controller 100; and information specifying whether the data is part of a RAID array with a RAID level requiring redundant data that also must be written to disk to be generated based on the posted-write data. Log data may also include debug data logs saved for debugging, or parity log data saved for RAID level 5 write hole fixing, a problem well known in the art of RAID controllers. Furthermore, as used herein, the terms critical memory bank and critical volatile memory bank are intended to denote a volatile memory bank that stores critical data.

The controller 100 includes a memory controller/bus bridge 124 coupled to a processor 108, a host interface 126, a disk interface 128, a plurality of volatile memory banks 102, and a corresponding plurality of switches 144. Each of the aforementioned circuits is coupled to receive main power 148 from a main power source. As used herein, the term control logic may be used to refer to the processor 108 or memory controller/bus bridge 124, individually or combination. Each of the aforementioned circuits is also coupled to receive battery power 142 from a battery 112 in the event of a loss of main power 148, as described in more detail below. The battery is re-charged via a re-charge signal 132 from the main power supply. In one embodiment, the memory controller and bus bridge circuit 124 is a custom large scale integrated circuit. The bus bridge 124 bridges a volatile memory bank 102 data bus 146, the processor 108 bus (which in one embodiment is a Pent-up processor bus), and the host interface 126 and disk interface 128 buses (which in one embodiment are PCI-X buses). The bus bridge 124 includes a memory controller for controlling the volatile memory banks 102. The memory controller/bus bridge 124 receives a main power present signal 114 indicating whether or not main power 148 is being supplied to the controller 100.

The disk interface 128 interfaces the controller 100 to disk drives or other mass storage devices, including but not limited to, tape drives, solid-state disks (SSD), and optical storage devices, such as CDROM or DVD drives. The disk drives store the user data. The disk interface 128 may include, but is not limited to, the following interfaces: Fiber Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, or FICON. The controller 100 reads and writes data from or to the disk drives in response to I/O requests received from host computers.

The host interface 126 interfaces the controller 100 with host computers. In one embodiment, the controller 100 is a local bus-based controller, such as a controller that plugs into, or is integrated into, a local I/O bus of the host computer system, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the controller 100 is a stand alone controller in a separate enclosure from the host computers that issue I/O requests to the controller 100. For example, the controller 100 may be part of a storage area network (SAN). In this type of embodiment, the host interface 126 may comprise various interfaces such as Fiber Channel, Ethernet, InfiniBand, SCIS, HIPPI, Token Ring, Arcnet, FDDI, LocalTalk, ESCON, FICON, ATM, SAS, SATA, and the like.

The volatile memory banks 102 are also referred to as cache memory banks 102. FIG. 1 illustrates an embodiment with three volatile memory banks 102, denoted banks 1 through 3. However, the invention is not limited to a particular number of volatile memory banks 102, but may be employed in any controller 100 with two or more volatile memory banks 102. The volatile memory banks 102 are volatile because they cease to store their data when they are not powered. In one embodiment, the volatile memory banks 102 comprise dynamic random access memory (DRAM), which includes a self-refresh mode. When the DRAM is placed into self-refresh mode, the DRAM consumes less power than when not operating in self-refresh mode. In other embodiments, the volatile memory banks 102 may include other types of volatile memory, such as static random access memory (SRAM). Each of the volatile memory banks 102 receives a self-refresh signal 106 from the memory controller/bus bridge 124 for placing the volatile memory banks 102 into self-refresh mode.

Each of the volatile memory banks 102 has a separate power input. Each of the volatile memory banks 102 receives power on its power input from a respective switch 144 whose output is coupled to provide power to the respective volatile memory bank 102 power input. Each switch 144 receives main power 148 from the main power supply. Each switch 144 also receives battery power 142 from the battery 112. The memory controller/bus bridge 124 separately controls each switch 144 by a separate control signal 136, referred to as control 1, control 2, and control 3, respectively in FIG. 1. Each control signal 136 selectively causes its respective switch 144 to: (1) provide main power 148 to its respective volatile memory bank 102; (2) provide battery power 142 to its respective volatile memory bank 102; or (3) disable power to its respective volatile memory bank 102. When the memory controller/bus bridge 124 disables power to the volatile memory bank 102, the volatile memory bank 102 is disconnected from receiving both the battery power 142 and main power 148, which advantageously causes the volatile memory bank 102 not to consume battery power 142. Disabling battery power 142 to the non-critical volatile memory banks 102 during a main power 148 outage advantageously extends the time the battery 112 can supply power to the critical volatile memory banks 102.

In one embodiment, the volatile memory banks 102 comprise physically separate memory devices each having a separate power input. In one embodiment, the physically separate memory devices comprise separate integrated circuits. In one embodiment, the plurality of volatile memory banks 102 comprise a dual incline memory module (DIMM) having two or more power rails. In one embodiment, the integrated memory circuits on each side of the DIMM have a separate power rail.

The processor 108, host interface 126, and disk interface 128, read and write data from and to the volatile memory banks 102 via the memory controller/bus bridge 124. The volatile memory banks 102 are coupled to the memory controller/bus bridge 124 via a data bus 146 used by the memory controller/bus bridge 124 to read and write data from and to the volatile memory banks 102. Transactions on the data bus 146 include an address specifying the location of data to be read or written within the volatile memory banks 102. Each of the volatile memory banks 102 occupies a different address range on the data bus 146 and within the address space of the processor 108, host interface 126, and disk interface 128.

In one embodiment, the critical data and the non-critical data that will be stored into the volatile memory banks 102 by the processor 108, host interface 126, and/or disk interface 128 is segregated into separate regions. In one embodiment, the segregation is performed by the software developer and coded into a file that specifies the memory map of program data, such as via an information file provided to a compiler/linker that compiles and links the controller 100 software. For example, in one embodiment, one critical data region exists and one non-critical data region exists. Write-cache buffers, metadata, debug logs, and parity logs are included in the critical data region; read-cache buffers and normal program variables are included in the non-critical data region. One or more of the volatile memory banks 102 are designated as critical and one or more of the volatile memory banks 102 are designated as non-critical. It is noted that both critical and non-critical volatile memory banks 102 may be used to store non-critical data; whereas, only critical volatile memory banks 102 are used to store critical data.

The processor 108 executes programs that control the transfer of data between the disk drives and the hosts. The processor 108 receives commands from the hosts to transfer data to or from the disk drives. In response, the processor 108 issues commands to the disk interface 128 to accomplish data transfers with the disk drives. Additionally, the processor 108 provides command completions to the hosts via the host interface 126. The processor 108 may also perform storage controller functions such as RAID control, logical block translation, buffer management, and data caching. In particular, the processor 108 stores into the memory controller/bus bridge 124 information indicating which of the volatile memory banks 102 are critical volatile memory banks 102 and which of the volatile memory banks are non-critical volatile memory banks 102.

The volatile memory banks 102 are employed by the controller 100 to buffer data transferred between the hosts and disks. When a host requests data to be read from the disks, the controller 100 transfers the data from the disks via the disk interface 128 to the volatile memory banks 102 and subsequently transfers the data from the volatile memory banks 102 via the host interface 126 to the host. The volatile memory banks 102 may also be used by the controller 100 to perform read-caching of data, i.e., to provide requested data to the hosts from the volatile memory banks 102, rather than from the disks, if the data is already present in the volatile memory banks 102 because of a previous read request of the same data.

Conversely, when a host requests data to be written to the disks, the controller 100 transfers the data from the host via the host interface 126 into the volatile memory banks 102 and subsequently transfers the data from the volatile memory banks 102 via the disk interface 128 to the disks. In particular, the volatile memory banks 102 are used by the controller 100 to perform write-caching of data. Normally, the controller 100 does not indicate to the host that the write request is complete until the data is actually written to disk. However, if configured to do so, the controller 100 may cache the data in the volatile memory banks 102 and indicate to the host that the write request is complete before the data is actually written to the disk, and subsequently write, or flush, the data to disk. This operation is referred to as write-caching, or may also be referred to as a posted-write operation. The data associated with a write-cache or posted-write operation is referred to as write-cache data or posted-write data. That is, write-cache data is data stored in the volatile memory banks 102 that has not yet been written to disk but concerning which the controller 100 has told the host that the write operation has completed. As stated above, write-cache data is critical data. Additionally, metadata that describes the write-cache data is also critical data. Additionally, the controller 100 may use the volatile memory banks 102 for buffering redundant RAID data generated for writing to the disks.

Figure 2:
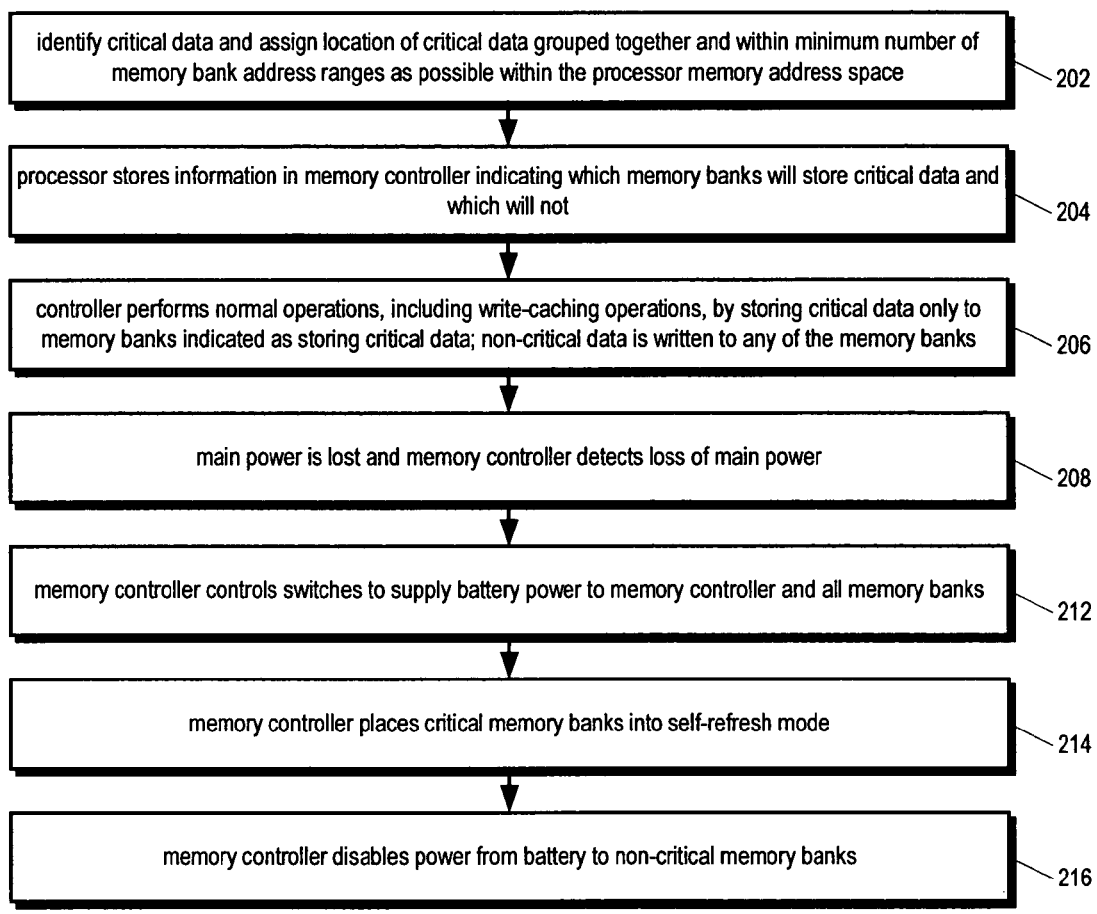
FIG. 2 is a flowchart illustrating operation of the controller of FIG. 1.

Referring now to FIG. 2, a flowchart illustrating operation of the controller 100 of FIG. 1 is shown. Flow begins at block 202.

At block 202, the critical data is identified. In one embodiment, the critical data is grouped together within the address space. In one embodiment, the critical data is grouped together such that the minimum number of volatile memory banks 102 must be designated as critical volatile memory banks. For example, assume the volatile memory banks 102 are four separate volatile memory banks 102 each capable of storing 512 MB of data, and assume the total amount of critical data is between 512 MB and 1 GB. Then the critical data would be grouped and located in the address space such that it is located within only two of the volatile memory banks 102, rather than three or four of the volatile memory banks 102. As mentioned above, in one embodiment, the software developer identifies the critical data and assigns the locations of the critical data to segregate it. Flow proceeds to block 204.

At block 204, the processor 108 stores information in the memory controller/bus bridge 124 indicating which of the volatile memory banks 102 are critical volatile memory banks 102 and which are non-critical volatile memory banks 102. At a minimum, the processor 108 communicates to the memory controller/bus bridge 124 which of the volatile memory banks 102 are non-critical volatile memory banks 102. Flow proceeds to block 206.

At block 206, after the controller 100 boots up, the controller 100 performs normal input/output (I/O) operations with the hosts and disk drives. In particular, the controller 100 performs write-caching operations, storing critical data only to critical volatile memory banks 102. As mentioned above, non-critical data may be stored in either critical or non-critical volatile memory banks 102. It is noted that initially the various circuit elements of the controller 100 are receiving main power 148. Flow proceeds to block 208.

At block 208, the controller 100 suffers the loss of main power 148 and the memory controller/bus bridge 124 detects the loss of main power 148 via main power present indicator 114. Flow proceeds to block 212.

At block 212, in response to the main power present indicator 114 indicating the loss of main power 148, the memory controller/bus bridge 124 generates the control signals 136 to cause the switches 144 to provide battery power 142 to their respective volatile memory banks 102. Additionally, the battery 112 provides power to the memory controller/bus bridge 124 and any other circuits of the controller 100 that must continue to receive power. Flow proceeds to block 214.

At block 214, the memory controller/bus bridge 124 places the critical volatile memory banks 102 into self-refresh mode via self-refresh signal 106 to reduce the amount of battery power 142 consumed by the critical volatile memory banks 102. Flow proceeds to block 216.

At block 216, the microprocessor 100 examines the information stored into it by the processor 108 specifying which of the volatile memory banks 102 are non-critical and generates the control signal 136 to cause the corresponding switch 144 for each of the non-critical volatile memory banks 102 to disable battery power 142, in order to reduce the amount of battery power 142 consumed by the controller 100, thereby extending the length of time the controller 100 can continue to retain the critical data until main power 148 is restored, and thereby reducing the likelihood that user data will be lost.

Although the present invention and its objects, features, and advantages have been described in detail, other embodiments are encompassed by the invention. For example, although embodiments have been described in which the storage controller is a RAID controller, the selective disabling of battery power to non-critical volatile memory banks as described herein may also be employed in any storage controller (i.e., a non-RAID controller) that uses a cache memory to post write operations to disk drives or other storage devices. Furthermore, although embodiments have been described in which the memory controller/bus bridge 124 detects the main power loss, places the volatile memory banks 102 in self-refresh mode, and disables battery power 142 to the non-critical volatile memory banks 102, in another embodiment the processor 108 performs these functions.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A write-caching mass storage controller, comprising:
   a plurality of volatile memory banks, each having separate power inputs;
   a battery, coupled to provide power to said plurality of volatile memory banks via said separate power inputs during a main power loss;
   switches, coupled to said battery and the main power, each having a control input, said switches configured to selectively provide power to said plurality of volatile memory banks from the main power or from said battery in response to said control input;
   a processor, coupled to said plurality of volatile memory banks, configured to control storage of critical data to a first subset of said plurality of volatile memory banks and to refrain from controlling storage of said critical data to a second subset of said plurality of volatile memory banks, wherein said first and second subset are mutually exclusive, wherein said critical data comprises data which must be retained during said main power loss to avoid loss of write-cached user data, wherein said processor is configured to execute programs; and
   control logic, coupled to said control input of said switches, configured to receive information from said processor specifying which of said plurality of volatile memory banks is included in each of said first and second subsets, and configured to control said switches to:
      provide main power to said plurality of volatile memory banks under normal conditions; and
      provide battery power to said first subset of volatile memory banks and disable said second subset of said plurality of volatile memory banks from receiving power from said battery in response to detecting said loss of main power.

2. The mass storage controller as recited in claim 1, wherein said critical data comprises said write-cached user data.

3. The mass storage controller as recited in claim 2, wherein said critical data further comprises metadata, said metadata describing said write-cached user data.

4. The mass storage controller as recited in claim 3, wherein said metadata specifies locations of said write-cached user data in said first subset of said plurality of volatile memory banks.

5. The mass storage controller as recited in claim 3, wherein said metadata specifies locations on one or more storage devices controlled by the controller to which said write-cached user data is to be written.

6. The mass storage controller as recited in claim 5, wherein said one or more storage devices comprise disk drives.

7. The mass storage controller as recited in claim 3, wherein said metadata comprises parity logs, used by said processor to fix RAID level 5 write holes.

8. The mass storage controller as recited in claim 3, wherein said metadata comprises debug logs.

9. The mass storage controller as recited in claim 1, wherein said control logic is further configured to place said first subset of said plurality of volatile memory banks into a low power mode in response to detecting said main power loss.

10. The mass storage controller as recited in claim 9, wherein said low power mode comprises a dynamic random access memory (DRAM) self-refresh mode.

11. The mass storage controller as recited in claim 1, wherein said plurality of volatile memory banks comprise banks of dynamic random access memory (DRAM).

12. The mass storage controller as recited in claim 1, wherein said plurality of volatile memory banks occupy separate address ranges within an address space of said processor.

13. The mass storage controller as recited in claim 1, wherein said plurality of volatile memory banks comprise physically separate memory devices, said memory devices having said separate power inputs.

14. The mass storage controller as recited in claim 13, wherein said physically separate memory devices comprise separate integrated circuits.

15. The mass storage controller as recited in claim 1, wherein the mass storage controller is a redundant array of inexpensive disks (RAID) controller and said processor performs RAID functions.

16. The mass storage controller as recited in claim 1, wherein said control logic comprises said processor.

17. The mass storage controller as recited in claim 1, wherein said first and second subsets of said plurality of volatile memory banks are determined by a memory map of program data provided to a compiler/linker that compiles and links software executed by said processor.

18. A method for reducing battery power consumption during a main power supply loss to reduce the likelihood of loss of user write-cached data in a write-caching mass storage controller, comprising:
supplying power from the main power supply to first and second subsets of a plurality of volatile memory banks of the controller, wherein the first and second subset are mutually exclusive;
receiving information from a processor indicating that the first subset of the plurality of volatile memory banks is storing critical data and that the second subset of the plurality of volatile memory banks is not storing critical data, wherein the critical data comprises data which must be retained during the main power supply loss to avoid loss of write-cached user data;
storing critical data to the first subset of the plurality of volatile memory banks in exclusion of the second subset of the plurality of volatile memory banks, while said supplying power from the main power supply to the first and second subsets of the plurality of volatile memory banks of the controller;
detecting the main power supply loss, after said storing the critical data;
supplying power from the battery to the first subset of the plurality of volatile memory banks in response to said detecting the main power supply loss; and
disabling the second subset of the plurality of volatile memory banks from receiving power from the battery in response to said detecting the main power supply loss.

19. The method as recited in claim 18, wherein the critical data comprises the write-cached user data.

20. The method as recited in claim 19, wherein the critical data further comprises metadata, the metadata describing the write-cached user data.

21. The method as recited in claim 20, wherein the metadata specifies locations of the write-cached user data in the first subset of the plurality of volatile memory banks.

22. The method as recited in claim 20, wherein the metadata specifies locations on one or more storage devices controlled by the controller to which the write-cached user data is to be written.

23. The method as recited in claim 22, wherein the one or more storage devices comprise disk drives.

24. The method as recited in claim 20, wherein the metadata comprises parity logs, used to fix RAID level 5 write holes.

25. The method as recited in claim 20, wherein the metadata comprises debug logs.

26. The method as recited in claim 18, further comprising:
placing the first subset of the plurality of volatile memory banks into a low power mode in response to said detecting the main power loss.

27. The method as recited in claim 26, wherein the low power mode comprises a dynamic random access memory (DRAM) self-refresh mode.

28. The method as recited in claim 18, wherein the plurality of volatile memory banks comprise banks of dynamic random access memory (DRAM).

29. The method as recited in claim 18, wherein the plurality of volatile memory banks occupy separate address ranges within an address space of a processor of the controller.

30. The method as recited in claim 26, further comprising:
assigning locations of the critical data within the address ranges of the first subset of the plurality of volatile memory banks, prior to said storing information indicating the first and second subsets.

31. The method as recited in claim 18, wherein the plurality of volatile memory banks comprise physically separate memory devices, the memory devices having the separate power inputs.

32. The method as recited in claim 31, wherein the physically separate memory devices comprise separate integrated circuits.

33. The method as recited in claim 18, wherein the mass storage controller is a redundant array of inexpensive disks (RAID) controller.

34. The method as recited in claim 18, further comprising:
determining said first and second subsets of said plurality of volatile memory banks by a memory map of program data provided to a compiler/linker that compiles and links software executed by said processor, prior to said supplying power from the main power supply.

35. A write-caching mass storage controller, comprising:
a plurality of volatile memory banks, each having separate power inputs;
a battery, coupled to provide power to said plurality of volatile memory banks via said separate power inputs, during a main power loss; and
switches, coupled to said battery and the main power, each having a control input, said switches configured to selectively provide power to said plurality of volatile memory banks from the main power or from said battery in response to said control input;
a processor, coupled to said plurality of volatile memory banks and to said control input of said switches, configured to control storage of critical data to a first subset of said plurality of volatile memory banks and to refrain from controlling storage of said critical data to a second subset of said plurality of volatile memory banks, wherein said first and second subset are mutually exclusive, wherein said critical data comprises data which must be retained during said main power loss to avoid loss of write-cached user data, wherein said processor is configured to execute programs, said processor further configured to control said switches to:
provide main power to said plurality of volatile memory banks under normal conditions; and
provide battery power to said first subset of volatile memory banks and, disable said second subset of said plurality of volatile memory banks from receiving power from said battery in response to detecting the loss of main power.

36. The mass storage controller as recited in claim 35, wherein said critical data comprises said write-cached user data.

37. The mass storage controller as recited in claim 36, wherein said critical data further comprises metadata, said metadata describing said write-cached user data.

38. The mass storage controller as recited in claim 37, wherein said metadata specifies locations of said write-cached user data in said first subset of said plurality of volatile memory banks.

39. The mass storage controller as recited in claim 37, wherein said metadata specifies locations on one or more storage devices controlled by the controller to which said write-cached user data is to be written.

40. The mass storage controller as recited in claim 37, wherein said metadata comprises parity logs, used by said processor to fix RAID level 5 write holes.

41. The mass storage controller as recited in claim 35, wherein said control logic is further configured to place said first subset of said plurality of volatile memory banks into a low power mode in response to detecting said main power loss.

42. The mass storage controller as recited in claim 35, wherein said plurality of volatile memory banks occupy separate address ranges within an address space of said processor.

43. The mass storage controller as recited in claim 33, wherein said first and second subsets of said plurality of volatile memory banks are determined by a memory map of program data provided to a compiler/linker that compiles and links software executed by said processor.

* * * * *